Figure 1:
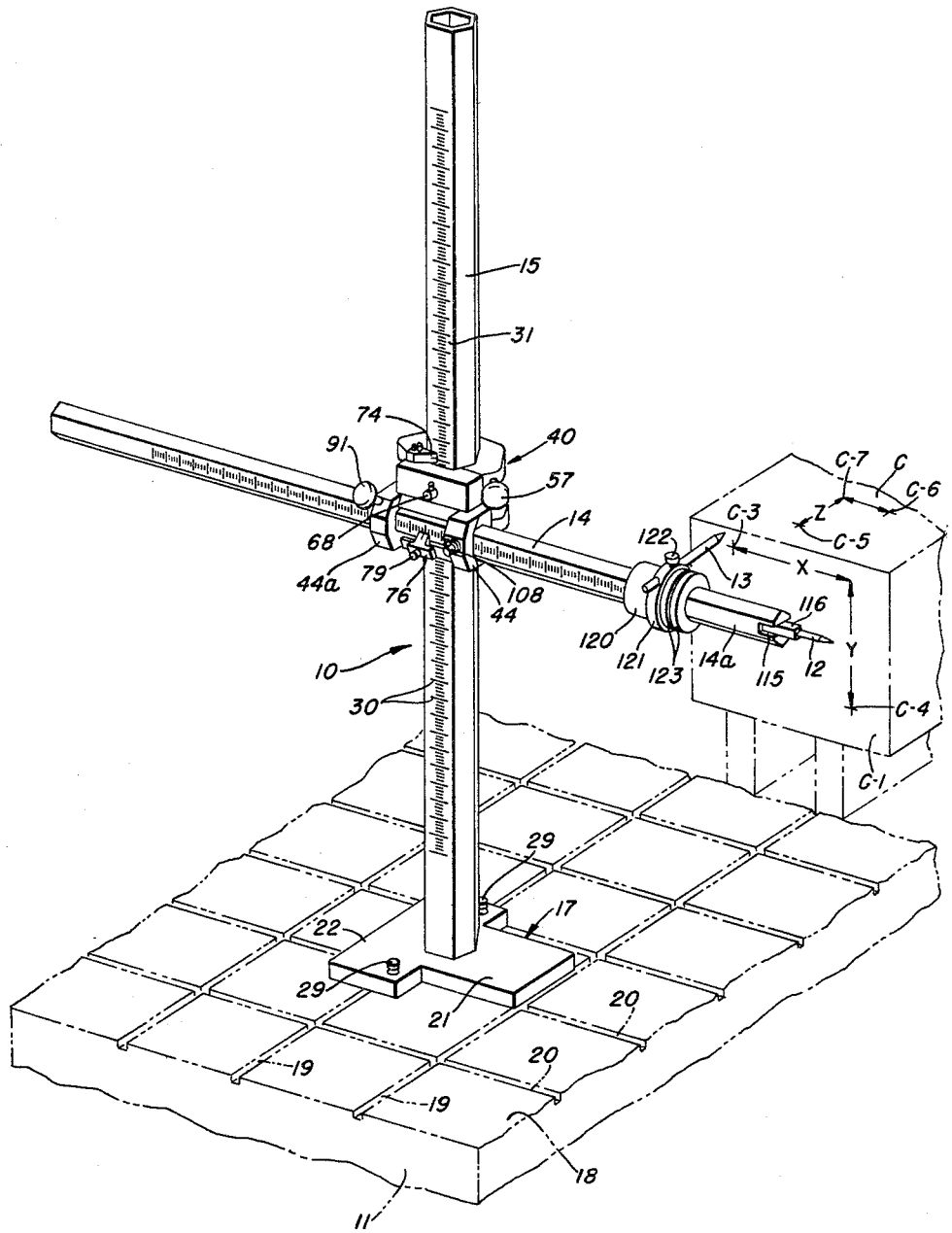

Dec. 25, 1962　　　　F. S. SCHILER　　　　3,069,778
　　　　　THREE DIMENSIONAL LAYOUT DEVICE
Filed March 24, 1958　　　　　　　　　　4 Sheets-Sheet 1

INVENTOR.
FREDERICK S. SCHILER
BY
ATTORNEY

INVENTOR.
FREDERICK S. SCHILER
BY
*William Freeman*
ATTORNEY

Dec. 25, 1962  F. S. SCHILER  3,069,778
THREE DIMENSIONAL LAYOUT DEVICE
Filed March 24, 1958  4 Sheets-Sheet 3

INVENTOR.
FREDERICK S. SCHILER
BY
ATTORNEY

Dec. 25, 1962  F. S. SCHILER  3,069,778
THREE DIMENSIONAL LAYOUT DEVICE
Filed March 24, 1958  4 Sheets-Sheet 4

INVENTOR.
FREDERICK S. SCHILER
BY
*William Freeman*
ATTORNEY

United States Patent Office 3,069,778
Patented Dec. 25, 1962

3,069,778
THREE DIMENSIONAL LAYOUT DEVICE
Frederick S. Schiller, Cuyahoga Falls, Ohio, assignor to Portage Machine Company, Akron, Ohio, a corporation of Ohio
Filed Mar. 24, 1958, Ser. No. 723,266
18 Claims. (Cl. 33—174)

This invention relates to layout devices for marking locations on planar surfaces and in particular, has reference to a new and improved type of layout device that is capable of making the layout in the three dimensional planes of a solid object.

In the art of machining heavy casting for example, a foundry, or other source, normally delivers the rough casting to the machine shop where the same is to be machined to final dimension. It has been the experience of machine shop operators that castings of this general type are often inaccurately cast, and due to such inaccuracy will not show up until after considerable time has been spent effectuating preliminary machining operations on the same.

To eliminate this, it has been the practice in the past to layout the hole or other patterns on the rough casting to see if the same can be properly machined. Normally, this is a time consuming effort, but it has been found from a business stand-point that the same is in actuality a cost savings, since it eliminates unnecessary machining operations which would be considerably more expensive.

In effectuating such preliminary layout prior to machining operations, the conventional practice to data has been to modify a conventional height gauge by attaching a scribing instrument thereto. In this manner, the scribing instrument can be moved through a certain height plane, with the height of the scribing instrument being determined by the graduation on the upright standard portion thereof. However, to effectuate two dimensional markings on rough castings of this type, it has always been necessary to turn the casting on the work surface and as a result, in the normal practice of checking castings in the manner described, it has been necessary to turn the piece several times during the layout operation. The disadvantages of such a procedure are believed manifest.

As a still further disadvantage of the known prior art type of height gauge, it has been further found that the coplanar abutment between the base of the layout device and the surface table, oftentimes results in some inaccuracy, due to the presence of foreign particles that accumulate on either one of the surfaces. Additionally, when the planar surface of the base is merely permitted to slide across the planar surface of the surface table, as is the case in conventional height gauges, it is difficult, if not impossible to provide a straight-line type of transverse marking on a horizontal surface of the work piece, with the result that the base of the height gauge must be made to slide against a straight edge attached to the top of the surface table in order to achieve straight line transverse movement of the scribing tool thereof.

It has been discovered that the aforementioned disadvantages can be eliminated by employing a more versatile type of layout device that has an elongate cross arm attached to the upright standard in vertically shiftable relationship therewith. Additionally, it has been found that if this cross arm is provided with graduations and made to be movable through a horizontal plane with respect to its point of connection on the upright standard, that even further improved results will occur. This latter is true, especially if one or more scribing instruments are attached to the end of the cross arm so that a marking can be obtained at a predetermined distance from the upright standard. In this manner, a three dimensional layout work be conducted without the necessity of having to turn the work piece in any way.

It has also been found that if the base member of the layout device is provided with retractable wheels or guide elements that are selectively engagable within transverse parallel grooves provided in the surface table, that transverse straight line markings can be effectuated on a surface of the work piece that is in parallel with the surface table.

Accordingly, it is the principal object of this invention to provide an improved type of layout device that is characterized by the fact that the same can mark or scribe indicia on three different dimensional surfaces of a rough piece of work supported on a surface table without the necessity for changing the position of the work piece on the table during such marking.

It is a still further subject of this invention to provide an improved type of layout device designed for use with a surface table having parallel grooves thereon, and which is characterized by the fact that the same can effectuate transverse, straight line markings on the horizontal surface of a work piece disposed on the surface table.

It is a still further object of this invention to provide an improved type of layout device of the character above described, which is completely accurate in dimensional marking, and which can be used by the average skilled workman with a minimal amount of effort.

These and other objects of the invention will become more apparent upon a reading of the following brief specification, considered and interpreted in the light of the accompanying drawings.

Figure 2:
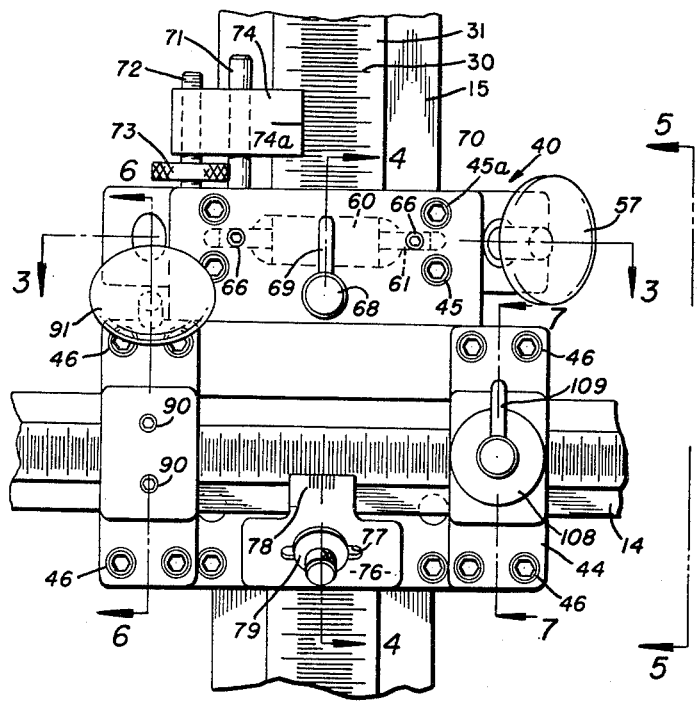
Figure 4:
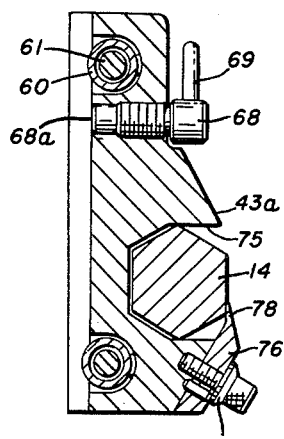
Figure 10:
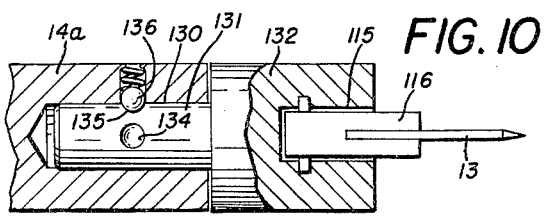
Figure 8:
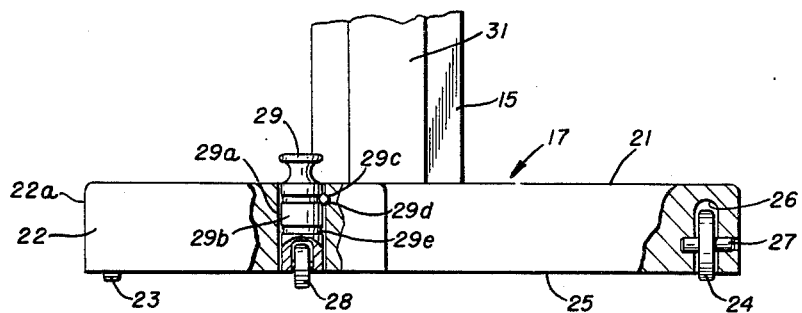
Figure 9:
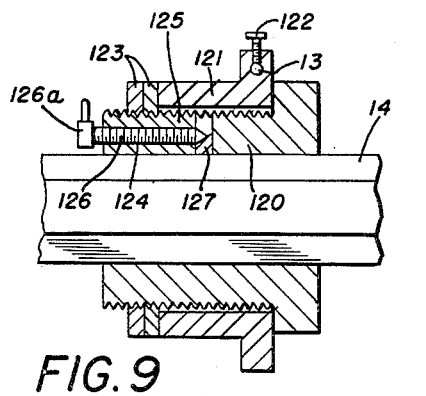
Figure 11:
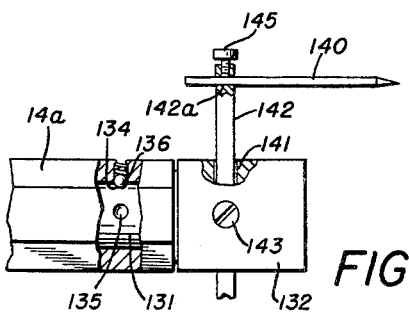
Figure 12:
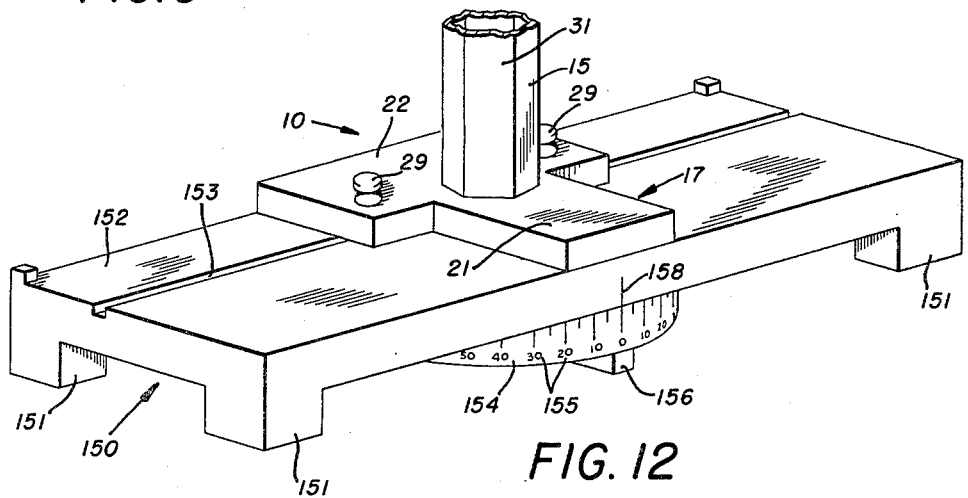

Of the drawings:
FIGURE 1 is a perspective view of the improved layout device positioned on a surface table.
FIGURE 2 is a fragmentary front elevation view showing interconnection between the standard and the cross arm.
FIGURES 2, 3, 4, 5, 6 and 7 are sectional views taken on the lines 2—2, 3—3, 4—4, 5—5, 6—6 and 7—7.
FIGURE 8 is an elevation view partly broken away in section of the base portion of the device.
FIGURE 9 is an elevational view, partly broken away and in sections and shows construction of one scribing member.
FIGURES 10 and 11 elevation views, partly broken away and in section, of modified forms of the invention.
FIGURE 12 is a perspective view of a further modification of the invention.

Referring now to the drawings and in particular to FIGURE 1 thereof, the improved layout device, generally indicated by the numeral 10, is shown positioned on a surface table 11, so as to have scribing instruments 12 and 13 swingable through elected planes upon relative movement between a cross bar 14 and an upright standard 15; with standard 15 projecting upwardly from a base member 17 that is designed to be positioned on the work table 11 as is clearly shown in FIGURE 1. In this manner, a three dimensional layout can be achieved on a casting C received on a surface table 11 without the necessity for changing or moving the casing during such layout operation.

Considering first the structure of the surface table 11, it will be seen from FIGURE 1 that the same includes a flat planar surface 18 within which are provided parallel grooves 19, 19 and 20, 20 with each groove 19 being preferable disposed at right angles to the grooves 20, as is clearly shown in FIGURE 1 of the drawings. It is to be understood in this regard, that these grooves extend transversedly of the surface table so as to connect the opposite sides of the same, with stops or other mediums being placed at the ends of the grooves to prevent overrunning of the same by the layout device 10.

Turning next to a consideration of the base member 17 and referring specifically to FIGURES 1 and 8 of the drawings, it will be seen that the preferred embodiment of the invention illustrated herein, is of T-shaped configuration in plan, so as to include a base portion 21 and a head portion 22, with the head portion 22 preferable having projecting wheel member 23, 24 while at least one wheel member 28 projects beyond the lowermost planar surface 25 of leg portion 21 as shown in FIGURE 8. The construction of the wheels 23 and 24 is preferable identical and it suffices to say that the same are journaled within slots 26, 26 by rotatably mounting the axial end portions 27 thereof in appropriate undercut portions of base 17. In this manner, the base member 17 may move across the planar surface 18 as a result of the contact of the wheel members 23 and 24 therewith. In addition to the wheel members just described, the head portion 22 further includes auxiliary wheel members 28, 28 that are respectively moved to the fully extended position of FIGURE 8 upon operation of handles 29, 29 in known fashion. In this regard, it is to be understood that two wheels 28, 28 are preferable provided parallel to the top edge surface 22a of head 22, and in this manner these wheels 28, 28 may be positioned within either the groove 19 or 20 for rotational movement therein.

As shown in FIGURE 8, this retractable arrangement may be achieved by providing the base with an opening 29a, within which member 29b may shift, with wheels 28, 28 being rotatably attached to member 29b. In this manner a ball detent 29c can be positioned in either groove 29d or 29e to selectively retain the device in extended or retracted condition.

In this fashion and as shown in FIGURE 10, the wheels 28, 28 project further beyond the surface 25 than do the wheels 23 and 24, with the difference in projection being equivalent to the depth dimension of the slots 19, 19 and 20, 20. Thus, the wheels 23 and 24 may ride over the surface of the table 11, while the wheels 28, 28 ride in the slot to effectuate guide movement of the base in a parallel condition.

Figure 3:
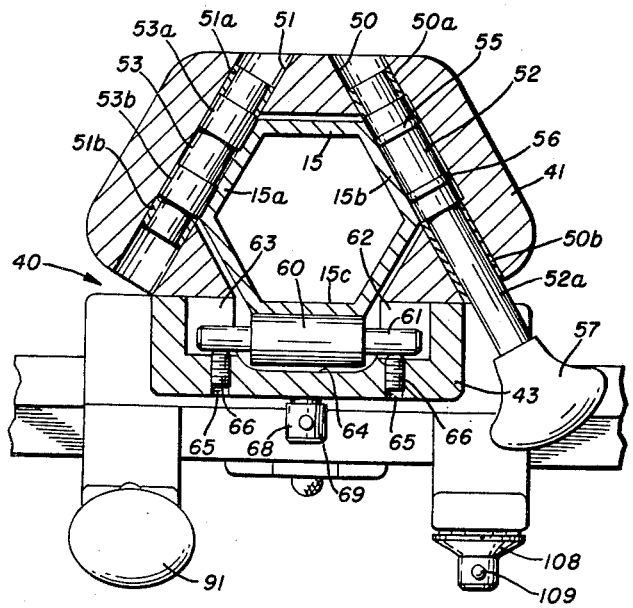

Referring next to FIGURES 1, 2 and 3, it will be seen that the upright standard 10 is preferably illustrated as being of elongate, hollow, hexagonal configuration so as to project upwardly from the base 17 at right angles therewith, with the usual graduations 30 being provided on one face 31 of the standard 15 in known manner.

Received around the upright standard 15 in relatively shiftable relationship therewith, is an adaptor unit indicated generally by the numeral 40 and illustrated best in FIGURES 2 through 7 of the drawings.

Figure 5:
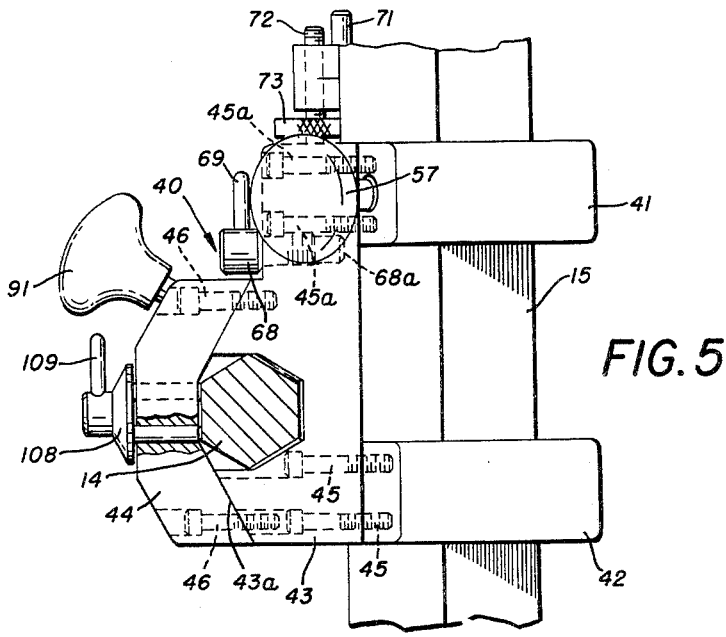

Referring first to FIGURE 5, it will be seen that the overall adaptor unit 40 includes an upper slide block 41, a lower slide block 42, a main clamping block 43 and a pair of auxiliary clamping blocks 44 and 44a, the arrangement being such that the clamping block 43 is secured with respect to the members 41 and 42 by screws 45a, 45a and 45, 45, while the auxiliary clamping blocks 44 and 44a are in turn, secured over the clamping block 43 at axially spaced points by screw members 46, 46. In this manner, the members 41, 42 and 43 will coact together to encircle the upright standard 15 in shiftable relationship therewith, while the clamping blocks 43, 44 and 44a will in turn surround the cross bar 14, as is clearly shown in FIGURE 5.

Referring now to FIGURE 3 for a detailed consideration of the upper member 41, it will be seen that the same is of generally U-shaped so as to be positionable in encircling relationship around the upright standard 15, with five sides of the member 15 being shown surrounded by component parts of the member 41. To the end of facilitating shifting of the member 41, the same is shown provided with bores 50 and 51, with the bore 50 having liners 50a and 50b, while similar liners 51b and 51b are disposed at axially separated points in the bore 51. In this manner, shafts 52 and 53 can be received in bores 50 and 51 respectively, with the opposed ends of these shafts abutting against the liners, as is clearly shown in FIGURE 3 of the drawings. Enlarged portions 53a and 53b, provided centrally of the shaft 53, facilitates rolling contact between the wall of the bore 51 and the external face 15a of standard 15.

Similarly, with regard to the shaft 52, it will be seen that the same is encircled by axially spaced, resilient O-rings 55, 56, that engage wall surface 15b of standard 15, as well as bore 50, as is shown in FIGURE 3. Also, and in order to facilitate external operation of shaft 52, extension 52a thereof connects at its projecting end with an externally located turning knob 57, and in this manner, the shaft 52 may be rotated upon turning of knob 57.

It is to be understood in this regard, that a second set of bearing rollers, similar to the member 53, would be provided in the lower member 42 for engagement, with the surfaces 15a and 15b of the standard 15 at axially spaced points. In this manner, the roller 53 as well as the rollers (not shown) of lower unit 42, would support the standard 15 while actual driving of the same, to effectuate relative movement would be accomplished by the resilient rings 55 and 56.

As has been previously indicated, the clamping block 43 is releasably attached with respect to the members 41 and 42 by the use of conventional bolt members 45a and 45, and accordingly, it will be understood that the members 41, 42 and 43 completely encircle the standard 15, as is shown in FIGURE 3. To the end of providing a third point of roller support against the standard 15, the graduated face 31 thereof, is shown engaged by a roller member 60, with the roller member 60 being disposed medianely of an elongate shaft 61, the opposed ends of which are journaled in slots 62 and 63, with these slot members 62 and 63 being interconnected by an enlarged opening 64 within which the roller 60 can rotate.

To the end of adjusting the degree of tension between the standard 15 and the previously described roller members 52 and 53, the clamping block 43 is further provided with tapped apertures 65, 65 within which set screws 66, 66, can be received to bear against the opposed axial ends of shaft 61 to accordingly regulate the clamping pressure as desired. A locking nut 68, having a handle 69, is rotatable so that its end 68a, will bear against the face 31 of the standard, so as to lock the entire unit 40 in any given position on the standard 15.

In addition to the aforementioned component parts, the upper surface 70 (FIGURE 2) of the clamping block 43 includes a projecting pin 71 as well as a threaded member 72, with the threaded member 72 being threadingly received in an appropriate aperture of block 43 and having a turning knob 73 for purposes to be described. In this fashion, a vernier scale 74, can be journaled around post members 71 and 72 so that upon operation of knob 73, the indicating portion 74a thereof will be moved relatively of the indicia 30 that are provided on scale 31, even though the adaptor unit 40 is locked in place on shaft 15.

For the purpose of cooperatively receiving the cross arm 14 in relatively shiftable relationship therewith, the lower front surface 43a of the clamping block 43 is shown provided with an undercut groove that is indicated generally by the numeral 75. A gauge plate 76 having a slot 77 and a vernier scale portion 78, is adjustably associated with the lower portion of the block 43 by the screw member 79; the arrangement being such that upon loosening of the screw 79, the vernier scale 78 can be shifted relatively of the cross arm 14 even though the same is locked in place with respect to the member 43 by means hereinafter to be described.

Figure 6:
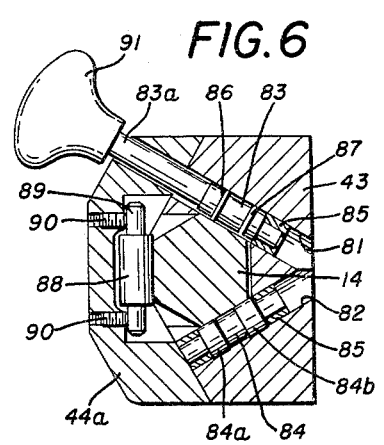
Figure 7:
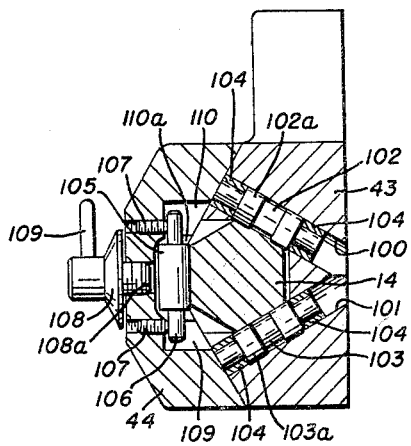

Turning next to FIGURES 5, 6 and 7, for a consideration of the manner in which the cross bar 14 is carried by the member 43 in relatively shiftable relationship therewith, it has been previously noted that the auxiliary clamping blocks 44, 44a coact with the slot 75 of member 43 to completely encircle the hexagonal shape cross bar member 14, with such attachment being facilitated, as previously indicated, by screw members 46, 46.

Accordingly, and referring first to FIGURE 6 for a detailed consideartion of the structure of and associated with the auxiliary clamping block 44a, it will be seen that the clamping block 43 is provided with bores 81 and 82, within which may be received shaft members 83 and 84, with these shaft members being retained in their proper axial position by the use of liners 85. As before, the shaft 84 has enlarged portions 84a and 84b for bearing contact between the bore 82 and one surface of the member 14, while the shaft 83 is encircled by resilient, axially spaced, O-rings 86 and 87 that serve as driving rings to effectuate movement of the member 14 relatively of the members 43 and 44a. A bearing roller 88, disposed medianely of a shaft 89, bears against a third surface of the member 14, with the amount of bearing being adjustable by use of set screws 90, 90 as before. A turning knob 91, provided on the projecting end 83a of shaft 83, facilitates driving by the resilient O-rings 86 and 87.

Referring next to FIGURE 7 for a detailed consideration of the manner in which the auxiliary block 44 coacts with the member 44 to encircle the cross bar 14, it will be seen that bores 100 and 101 of block 43, receive shafts 102 and 103, with each shaft having enlarged portions 102a and 103a that facilitate rolling engagement between the portions 100 and 101 and the shaft 14. As before, liners 104, 104 retain the shaft members in their proper axial location. Additionally, and much in the manner of FIGURE 6, a third bearing roller 105 is received on shaft 106 with set screws 107, 107 bearing against the axial ends of the shaft 106 to facilitate adjustment of the rolling contact between the rollers and the member 14.

For the purpose of locking the member 14 against movement with respect to the member 43, a locking screw 108 (FIGURE 7), is provided with a handle 109; the arrangement being such that upon rotating handle 109, the axial end 108a lock screw 108 will bear against roller 105 and preclude further rotational movement of the same. It is to be understood that both the auxiliary clamping blocks 44 and 44a are provided with end slots 110, 110, within which the axial ends of shafts 89 and 106 can be journaled, with an enlarged center portion 110a, 110a being provided in each slot 110 to permit rotation of the rollers 88 and 105.

In addition to the aforementioned component parts, it has been previously indicated that the cross arm 14 carries the scribing instruments 12 and 13 adjacent one end thereof, and to this end, the axial end 14a, of the arm 14, is shown provided with a slot 115 within which a block 116 may be pinned for pivotal movement. In this manner, the scribing instrument 12, being received in the block 116, may be moved through an arc parallel to the surface table 11.

Turning next to FIGURE 9 for a consideration of the manner in which the scribing instrument 13 is mounted on cross arm 14, it will be seen that the cross arm is surrounded by an elongate sleeve 120, that is externally threaded so as to receive a second axially elongated sleeve 121 to which the scribing instrument 13 can be releasable secured, as by set screw 122, with lock nuts 123, 123 being used in normal fashion to secure the members 120 and 121 in position.

To the end of adjusting the scribing instrument 13 relatively of the cross-arm 14, the sleeve 120 is further provided with bores 124, 125 with bore 124 receiving stud screw 126, while bore 125 receives a wedge block 127. In this manner, when handle 126a is turned, the wedge block 127 will be forced against the arm 14 so that relative movement will be precluded at this point when tightened. However, it is believed apparent that relative movement can occur between arm 14 and scribing instrument 13.

In use or operation of the improved layout device 10, it will first be assumed that the same has been assembled as indicated in FIGURE 1, and positioned on the surface table 11 as indicated therein. At this point, and assuming that points $C_3$ and $C_4$ are to be located on the surface C–1 of casting C, it is merely necessary that the member 40 be raised on standard 14 by turning knob 57 to the point indicated and that the cross arm 14 be adjusted to the appropriate position shown in FIGURE 1 by turning knob 91. At this point, it will be assumed that the distance X between holes $C_3$ and $C_4$ is to be measured.

Accordingly, it is first merely necessary that the scribing instrument 13 be positioned on the vertical line of the hole $C_3$ and a reading taken on the vernier scale 78. At this point, the locking handle 109 may be released and the knob 91 rotated to move the member 14 to the right of FIGURE 1. At this time, fine adjustment cannot be effectuated until a vertical line is scribed that passes through the point $C_4$ and at this point, a reading can be taken on the vernier scale 78 and the distance readily calculated by simple subtraction. It is believed manifest that, if desired, the vernier portion 78 can be first positioned on zero reading on arm 14, at which time the scriber 13 can be moved relatively of arm 14, as by loosening handle 126a, thus to pass through the point $C_3$. After this, the handle 126a can be locked with the result that when the point $C_4$ is marked, a direct reading can be obtained.

By like token, if the dimension Y is to be determined, it is merely necessary that knob 57 be first turned until member 12 scribes a horizontal line through the center of hole $C_3$. At this point, the arm 14 can be lowered by turning knob 57 until the horizontal arc of the scribe passes through the center line of hole $C_4$. At this point, a comparison of the vernier reading obtained on scale 74 in the respective positions will result in determination of the dimension Y.

If it is next desired to obtain the distance Z between the points $C_5$ and $C_6$ in plane $C_7$, it is merely necessary that the base portion 17 of the layout device 10 be rotated 90 degrees and repositioned on the surface table. At this time, the scribing instrument 13 could be used by obtaining readings on vernier 78 to determine the dimension Z.

It is believed apparent that other surface dimensions on the remaining surfaces of the casting could be achieved without the necessity for moving the casting.

It will be seen from the foregoing that there has been provided a new and improved type of layout device, characterized by the fact that the same can accurately dimension and lay out hole or other patterns in the three planar dimensions of a body received on a surface table. It has shown how the unique feature of adjusting the cross arm, both horizontally and vertically with respect to the upright standard, permits this plurality of planar measurement and how the accuracy of all measurements is insured by the use of the component parts in the novel combination described. It has further shown how a new and highly simplified type of driving arrangement has been utilized to greatly reduce the cost involved, while maintaining an improved degree of efficiency of operation.

While a full and complete disclosure of the invention has been set forth in accordance with the dictates of the Patent Statutes, it is not intended that the invention be restricted to the specific embodiment illustrated herein. For example, while a simplified type of resilient driving means has been employed, it is to be understood that the invention contemplates the use of other types of driving arrangements, with rack and pinion types of drive means being perfectly suitable for use in this regard.

Also, while certain of the rollers have been shown as being adjustable for the purpose of varying the bearing pressure against the upright standard 15 and the cross arm 14, for example, it is to be understood that other of the rollers illustrated could similarly be made adjustable with equivalent results. Additionally, while the member 40 has been shown as being of a split type of arrangement so as to facilitate encirclement of the upright standard 15, it is to be understood that one piece type of casting could be employed, if desired, under production conditions.

Referring next to FIGURE 10 of the drawings, it will be seen that the modified form of the invention illustrated therein envisions the movement of the mounting socket for the scriber 12 around the axis of rotation of the cross arm 14. Accordingly, the outboard end of the arm 14 is shown provided with a blind bore 130 within which can be received an extension 131 of an adapter socket 132, with this adapter socket carrying both block 116 and scriber 12 as is clearly indicated in FIGURE 10.

To the end of facilitating rotational movement between 90 degree positions, the extension 131 is provided with depressions 134 and 135. With these depressions being 90 degrees to each other so as to be selectively engaged by a spring-loaded ball 135. In this manner, the scriber 13 can be made to move through a horizontal and vertical arc depending upon whether the ball 136 is received in depression 134 or 135.

The modified form of the invention shown in FIGURE 11 is similar to that previously discussed in connection with FIGURE 10, and accordingly, where indicated, like numerals will indicate like-parts.

In this modified form of the invention, however, it is contemplated that the adapter member 132 be modified so as to permit the use of an auxiliary scribing instrument 140 which may be rotated around the axis of rotation of member 14 and extension 131.

Accordingly, in this modification, the member 132 is shown provided with a cross-bore 141 within which may be received a graduated standard 142. With this standard 142 being retained in place with respect to member 132 by a set screw 143. In this manner, the outboard end 142a of standard 142 may be apertured to receive the marking tool 140, with the marking tool 140 being retained in place with respect to standard 142 by a conventional turning knob 145. It will be seen in this manner that the scribing instrument 140 can thus be adjusted to generate a circle of any given diameter around the axis of rotation of the extension 131.

The modification of FIGURE 12 is designed to adapt the unit 10 for oblique movement on table 11, and accordingly, it will be noted that this modification contemplates the use of an adapter block that is indicated generally by the numeral 150, and which has a plurality of depending legs 151, 151 that will rest upon the surface table 11. In this manner, with the device 150 received on the table 11, the layout device can be received on the planer surface 152 thereof as is clearly shown in FIGURE 12 of the drawing, with slot 153 facilitating movement of the layout member 10 relatively of the adaptor member 150.

Since the modification of FIGURE 12 contemplates the transverse marking at an acute angle with respect to any given edge of table 11, the member 150 further includes a cylindrical plate 154, that is provided with graduations 155, while also being mounted for rotation around the member 150 in known manner. Additionally, the member 154 has its lower (FIGURE 12) face provided with a rib 156, with this rib being designed to be received either in the groove 19 or 20 of table 11.

In this manner, when the rib 156 is positioned within either groove, 19 or 20, the entire unit 150 can be rotated relatively of table 11 and cylindrical plate 154 until the desired angle between these parts is obtained with this angle being determined, by matching the proper graduation 155 with marking line 158 that is provided on the member 150. When this positon has been reached, movement of the member 10 relatively of slot 153 will cause the layout tool to move obliquely of the surface table 11 at the proper angle selected.

In the preceding forms of the invention disclosed, the layout device has been illustrated as being utilized with a table having appropriate slots provided on the work surface thereof for receiving complemental parts of the layout device. It is to be understood that the invention is in no sense limited to use on such type of table, and that if an ordinary surface table were employed, the same could be utilized with the improved layout tool by merely releasably clamping guide rails over the work surface thereof.

Also, in this regard and with particular reference to FIGURE 11, it is to be understood that the base could be equipped with a magnetic or other holding device that would temporarily fix the same immovably on the work surface so that the scriber 150 could be accurately rotated about its axis.

Other modifications of the invention may be resorted to without departing from the spirit hereof or the scope of appended claims.

What is claimed is:

1. A layout device for use on a surface table having straight elongate guide surfaces, comprising; a base slidably supported on said surface table and having a planar surface disposed in substantial parallelism with said surface table when said base is slidably supported thereon; guide means carried by said base and being releasably engageable with said elongate guide surfaces of said surface table, whereby said base may be moved across said table in a straight line path of movement; an upright standard carried by and projecting from said base at right angles to said planar surface thereof with said standard having a longitudinal axis; a mounting bracket carried on said standard in longitudinally shiftable relationship therewith; an elongate cross arm carried by said bracket in longitudinally shiftable relationship therewith and having a longitudinal axis that is disposed at right angles to said longitudinal axis of said standard; whereby said cross arm is maintained at right angles to said standard during movement of said bracket relatively of said cross arm and said standard; and scribing means carried by said cross arm and adapted to define height, width and depth dimensions with respect to an object supported on said surface table; said bracket being fixed against relative rotation around the longitudinal axis of said standard and said cross arm; said base being held against rotation with respect to said guide means during engagement therebetween, whereby said longitudinal axis of said cross arm is at right angles to said straight line path of movement of said base.

2. The device of claim 1 further characterized by the fact that said scribing means are movably mounted on said cross arm so as to be movable relatively of said cross arm through a plane that is at right angles to said cross arm.

3. The device of claim 1 further characterized by the fact that said scribing means may be adjustably shifted along the longitudinal axis of said cross arm.

4. The device of claim 1 further characterized by the fact that said scribing means include an elongate scribing element pivoted at one end to an axial end of said cross arm and being swingable through a plane that is normal to said planar surface of said base.

5. The device of claim 1 further characterized by the fact that said scribing means include an elongate scribing element pivoted at one end to an axial end of said cross arm and being swingable through a plane that is parallel to said planar surface of said base.

6. The device of claim 1 further characterized by the fact that said scribing means include an adaptor socket carried by one axial end of said cross arm in longitudinally concentric telescoped relationship therewith; an elongate scribing element pivoted at one elongate end thereof to the projecting end of said socket; indexing means adapted to permit 90° rotation of said socket with respect to said cross arm whereby said scribing element can be selectively pivoted through right angle planes of movement.

7. The device of claim 1 further characterized by the fact that said scribing means include an adaptor socket carried by one axial end of said cross arm in longitudinally concentric telescoped relationship therewith; said socket having a transverse opening passing through the axis thereof that is concentric to the longitudinal axis of said cross arm; an elongate scriber supporting arm received in said transverse opening and projecting radially of said cross arm; a scribing element carried by a projecting end of said scriber supporting arm and being disposed at right angles thereto whereby the same may be disposed in parallel to the longitudinal axis of said cross arm of a radially spaced distance therefrom; indexing means adapted to permit rotation of said socket with respect to said cross arm whereby said scribing element can be circularly rotated around the longitudinal axis of said cross arm.

8. The device of claim 7 further characterized by the fact that said scriber supporting arm is adjustable longitudinally in said transverse opening whereby the diameter of circle scribed by said scribing element can be varied.

9. The device of claim 8 further characterized by the presence of means for measuring the amount of shifting of said scriber supporting arm relatively of said transverse openings.

10. The device of claim 1 further characterized by the fact that said scribing means include first and second scribing elements; said first scribing element being movable relatively of said cross arm through a plane that is at right angle to said cross arm; said second scribing element being elongate and being pivoted to one end of said cross arm.

11. The device of claim 10 further characterized by the presence of means for shifting said second scribing element around the longitudinal axis of said cross arm whereby the plane of pivotal movement thereof may be varied between horizontal and vertical planes of pivotal movement.

12. A layout device for use on a surface table having first and second sets of parallel straight elongate guide surfaces that are arranged at right angles to each other, comprising; a base slidably supported on said surface table and having a planar surface disposed in substantial parallelism with said surface table when said base is slidably supported thereon; guide means carried by said base and being releasably engageable with any of said elongate guide surfaces of said first and second sets whereby said base may be moved across said base in at least two straight line paths of movement; an upright standard carried by and projecting from said base at right angles to said planar surface thereof with said standard having a longitudinal axis; a mounting bracket carried on said standard in longitudinally shiftable relationship therewith; an elongate cross arm carried by said bracket in longitudinally shiftable relationship therewith and having a longitudinal axis that is disposed at right angles to said longitudinal axis of said standard; whereby said cross arm is maintained at right angles to said standard during movement of said bracket relatively of said cross arm and said standard; and scribing means carried by said cross arm and adapted to define height, width and depth dimensions with respect to an object supported on said surface table; said bracket being fixed against relative rotation around the longitudinal axis of said standard and said cross arm; said base being held against rotation with respect to said guide means during engagement therebetween, whereby said longitudinal axis of said cross arm is at right angles to at least one said straight line path of movement of said base.

13. A layout device for use on a surface table having straight elongate guide surfaces, comprising; a base slidably supported on said surface table and having a planar surface disposed in substantial parallelism with said surface table when said base is slidably supported thereon; guide means carried by said base and being releasably engageable with said elongate guide surfaces of said surface table; whereby said base may be moved across said table in a straight line path of movement; an upright standard carried by and projecting from said base at right angles to said planar surface thereof with said standard having a longitudinal axis; a mounting bracket carried on said standard in longitudinally shiftable relationship therewith; an elongate cross arm carried by said bracket in longitudinally shiftable relationship therewith and having a longitudinal axis that is disposed at right angles to said longitudinal axis of said standard; whereby said cross arm is maintained at right angles to said standard during movement of said bracket relatively of said cross arm and said standard; scribing means carried by said cross arm and adapted to define height, width and depth dimensions with respect to an object supported on said surface table; said bracket being fixed against relative rotation around the longitudinal axis of said standard and said cross arm; said base being held against rotation with respect to said guide means during engagement therebetween, whereby said longitudinal axis of said cross arm is at right angles to said straight line path of movement of said base; and roller means supporting said base with respect to said surface table; said elongate guide surfaces being slots; said guide means being retractable rollers that are received in said slots when the same are in extended position.

14. A layout device for use on a surface table having straight elongate guide surfaces, comprising; a base slidably supported on said surface table and having a planar surface disposed in substantial parallelism with said surface table when said base is slidably supported thereon; guide means carried by said base and being releasably engageable with said elongate guide surfaces of said surface table, whereby said base may be moved across said table in a straight line path of movement; an upright standard carried by and projecting from said base at right angles to said planar surface thereof with said standard having a longitudinal axis; a mounting bracket carried on said standard in longitudinally shiftable relationship therewith; and elongate cross arm carried by said bracket in longitudinally shiftable relationship therewith and having a longitudinal axis that is disposed at right angles to said longitudinal axis of said standard; whereby said cross arm is maintained at right angles to said standard during movement of said bracket relatively of said cross arm and said standard; scribing means carried by said cross arm and adapted to define height, width and depth dimensions with respect to an object supported on said surface table; said bracket being fixed against relative rotation around the longitudinal axis of said standard and said cross arm; said base being held against rotation with respect to said guide means during engagement therebetween, whereby said longitudinal axis of said cross arm is at right angles to said straight line path of movement of said base; first drive means shifting said bracket relatively of said standard; second drive means shifting said cross arm relatively of said bracket.

15. A layout device for use on a surface table having straight elongate guide surfaces, comprising; a base slidably supported on said surface table and having a planar surface disposed in substantial parallelism with said surface table when said base is slidably supported thereon; guide means carried by said base and being releasably engageble with said elongate guide surfaces of said surface table, whereby said base may be moved across said table in a straight line path of movement; an upright standard carried by and projecting from said base at right angles to said planar surface thereof with said standard having a longitudinal axis; a mounting bracket carried on said standard in longitudinally shiftable relationship therewith; an elongate cross arm carried by said bracket in longitudinally shiftable relationship therewith and having a longitudinal axis that is disposed at right angles to said longitudinal axis of said standard; whereby said cross arm is maintained at right angles to said standard during movement of said bracket relatively of said cross arm and said standard; and scribing means carried by said cross arm and adapted to define height, width and depth dimensions with respect to an object supported on said surface table; said bracket being fixed against relative rotation around the longitudinal axis of said standard and said cross arm; said base being held against rotation with respect to said guide means during engagement therebetween, whereby said longitudinal axis of said cross arm is at right angles to said straight line path of movement of said base; said standard being rotatable relatively of said straight elongate guide surfaces around its longitudinal axis.

16. The device of claim 15 further characterized by the presence of means for measuring the amount of rotation of said standard relatively of said base.

17. A layout device for use on a surface table having straight elongate guide surfaces, comprising; a base slidably supported on said surface table and having a planar surface disposed in substantial parallelism with said surface table when said base is slidably supported thereon; guide means carried by said base and being releasably engageable with said elongate guide surfaces of said surface table, whereby said base may be moved across said table in a straight line path of movement; an upright standard fixed to and projecting from said base at right angles to said planar surface thereof with said standard having a longitudinal axis; a mounting bracket carried on said standard in longitudinally shiftable relationship therewith; an elongate cross arm carried by said bracket in longitudinally shiftable relationship therewith and having a longitudinal axis that is disposed at right angles to said longitudinal axis of said standard; whereby said cross arm is maintained at right angles to said standard during movement of said bracket relatively of said cross arm and said standard; scribing means carried by said cross arm and adapted to define height, width and depth dimensions with respect to an object supported on said surface table; said bracket being fixed against relative rotation around the longitudinal axis of said standard and said cross arm; said longitudinal axis of said cross arm being at right angles to said straight line path of movement of said base; first and second measuring indicia adapted to respectively measure relative movement of said bracket with respect to said cross arm and said standard.

18. A layout device of the character described, comprising; a table having straight elongate guide surfaces; a base slidably supported on said surface table and having a planar surface disposed in substantial parallelism with said surface table when said base is slidably supported thereon; guide means carried by said base and being releasably engageable with said elongate guide surfaces of said surface table, whereby said base may be moved across said table in a straight line path of movement; an upright standard fixed to and projecting from said base at right angles to said planar surface thereof with said standard having a longitudinal axis; a mounting bracket carried on said standard in longitudinally shiftable relationship therewith; an elongate cross arm carried by said bracket in longitudinally shiftable relationship therewith and having a longitudinal axis that is disposed at right angles to said longitudinal axis of said standard; whereby said cross arm is maintained at right angles to said standard during movement of said bracket relatively of said cross arm and said standard; and scribing means carried by said cross arm and adapted to define height, width and depth dimensions with respect to an object supported on said surface table; said bracket being fixed against relative rotation around the longitudinal axis of said standard and said cross arm; said longitudinal axis of said cross arm being at right angles to said straight line path of movement of said base.

References Cited in the file of this patent

UNITED STATES PATENTS

| | | |
|---|---|---|
| 359,336 | Walker | Mar. 15, 1887 |
| 491,840 | Field | Feb. 14, 1893 |
| 556,703 | Starrett | Mar. 17, 1896 |
| 1,134,106 | Clark | Apr. 6, 1915 |
| 1,295,936 | Spellman | Mar. 4, 1919 |
| 1,743,024 | Clark | Jan. 7, 1930 |
| 2,325,558 | Uslan | July 27, 1943 |
| 2,329,635 | McGall | Sept. 14, 1943 |
| 2,337,144 | Young | Dec. 21, 1943 |
| 2,394,137 | Barlow | Feb. 5, 1946 |
| 2,540,738 | Kaplowitz | Feb. 6, 1951 |
| 2,541,535 | Neff | Feb. 13, 1951 |
| 2,564,376 | Schwartz | Aug. 14, 1951 |
| 2,594,457 | Kunzler | Apr. 29, 1952 |
| 2,670,542 | Hull | Mar. 2, 1954 |
| 2,676,413 | Warton | Apr. 27, 1954 |
| 2,771,683 | Kirchhof | Nov. 27, 1956 |

FOREIGN PATENTS

| | | |
|---|---|---|
| 83,068 | Switzerland | Apr. 1, 1920 |
| 535,838 | England | Apr. 23, 1941 |
| 961,497 | France | May 12, 1950 |

OTHER REFERENCES

Brown & Sharpe Catalogue #30, pp. 161–162, pub. 1926, Brown & Sharpe Mfg. Co., Providence, R.I. (Copy in Div. 66.)